United States Patent [19]

Titcomb

[11] 4,379,566
[45] Apr. 12, 1983

[54] OPERATOR POWERED VEHICLE

[75] Inventor: Steven E. Titcomb, Stoneham, Mass.
[73] Assignee: Creative Motion Industries, Inc., Danvers, Mass.
[21] Appl. No.: 228,264
[22] Filed: Jan. 26, 1981
[51] Int. Cl.³ .................. B62K 21/18; B62M 1/04
[52] U.S. Cl. .................. 280/251; 280/253; 280/255; 280/278; 280/279
[58] Field of Search ........... 280/251, 253, 255, 243, 280/278, 279, 287

[56] References Cited
U.S. PATENT DOCUMENTS

| | | | |
|---|---|---|---|
| 1,587,650 | 6/1926 | Johnson | 280/251 |
| 1,653,889 | 12/1927 | Clark | 280/251 |
| 2,053,835 | 9/1936 | Kimball et al. | 280/251 |
| 2,062,830 | 12/1936 | Sabaeff | 280/254 |
| 2,449,266 | 9/1948 | Woods | 280/251 |
| 2,739,492 | 3/1956 | Lux | 280/236 |
| 3,375,023 | 3/1968 | Cox | 280/251 |
| 3,913,945 | 10/1975 | Clark | 280/251 |
| 3,938,403 | 2/1976 | Donaldson | 280/236 |
| 4,111,447 | 9/1978 | Ishida | 280/278 |
| 4,132,428 | 1/1979 | Lassiére | 280/278 |

Primary Examiner—Joseph F. Peters, Jr.
Assistant Examiner—Donn McGiehan
Attorney, Agent, or Firm—Cesari and McKenna

[57] ABSTRACT

An operator powered vehicle configured to be ridden by an operator in an upright or forced weight position wherein muscle force provided to pedals is augmented by the weight of the operator and by an upward force provided by the operator's arms on the handle bars. Lever-type pedal arms having an up and down motion are employed and the pedal arms are coupled to the rear wheel by one or two flexible drive cables. The cables are wrapped about the rear wheel hub in unsecured relation thereto so that the bicycle may be moved backwardly without damage to the drive cable or to the wheel. The ends of the cables are tensioned to prevent the cables from becoming unwrapped from the rear wheel hub. Means are provided to permit disassembly of the steering assembly and the front wheel from the frame to provide for ease of carrying and storage of the vehicle when it is not being used.

38 Claims, 18 Drawing Figures

OPERATOR POWERED VEHICLE

FIELD OF THE INVENTION

This invention relates generally to operator powered vehicles and more particularly to bicycles, bicycle frames and bicycle drive mechanisms.

BACKGROUND OF THE INVENTION

An operator powered vehicle, especially a bicycle, includes three elements with which the operator may interact. These elements are the handle bars, the seat, and the pedals. Heretofore, bicycles have deployed these three elements so that the weight of the operator which may be used to propel the bike is distributed between the seat and the handle bars, such as in the bicycle shown in U.S. Pat. No. 3,375,023. Bicycles of this design rely primarily on the muscle power provided by the operator's legs. Also, the pedals move with a rotary motion so that the weight of the operator is not always directed downwardly on the pedals and so that the pedal position shifts back and forth along the length of the bicycle with respect to the operator's center of gravity. Further bicycle refinement has included a lowering of the handle bars which encourages the rider to lean forward to reduce his air resistance while in motion, as illustrated by the drawings in U.S. Pat. No. 3,938,403. This configuration has the effect of further displacing the potential driving force of the operator's weight by shifting his center of gravity forward so that a part of his weight is placed over the front wheel and only a part of his weight is available to provide a downward force on the pedals. Often in such bicycles, the center of gravity of the operator is displaced outside of his body. An additional adverse consequence of the operator position on the vehicle in relation to the seat, the handle bars, and the pedals is that the operator often has vision difficulties because he can't see motorists, nor can they see him, and the operator is very uncomfortable while riding the bicycle. Because the frame is high off the ground, the operator finds it difficult to easily mount or dismount from the bicycle.

A suggested solution to the mount/dismount problem and to the weight distribution problem is found in a pedal powered scooter. However, prior art scooters, with their small pedal displacement, inefficient drive mechanisms and short wheel bases are generally unsuitable for anything more than short distance trips, at low speeds. As a result, such scooters are generally restricted for use as a toy. Additionally, the drive systems of prior art scooters have serious drawbacks. In some scooters, such as those found in U.S. Pat. Nos. 2,053,835 and 2,062,830, the treadles have a rear pivot, thus potentially causing the scooter to catapult over the free end of the treadle, should the drive mechanism break. In other scooters, such as in that shown in U.S. Pat. No. 2,053,835, the drive cable is connected to the rear axle hub, in a manner which prevents the scooter from being moved in a backward direction. If such a scooter is pushed backwardly, or slides backwardly down a hill, drive mechanism or transmission damage may result.

Although bicycles or scooters which fold or disassemble are available, as shown in U.S. Pat. Nos. 4,111,447 and 3,220,748, few of such vehicles may be disassembled quickly and easily to be transported conveniently in an urban environment. Also, such vehicles are bulky and awkward in their disassembled state, and they occupy a large amount of floor space, making them inconvenient for carrying on a mass transit vehicle.

SUMMARY OF THE INVENTION

Broadly speaking, the vehicle of the present invention provides for an arrangement of the pedals, handle bars and seat so that the operator may augment the drive force which his legs provide to the pedals by an upward force exerted by his arm muscles on the handle bars of the bicycle and by his own body weight. More specifically, lever-like pedal arms are provided wherein the operator of the bicycle assumes a substantially upright position and his center of gravity is disposed generally above the pedal arms and is displaced from the pivot point of the pedal arms. The pedal arms pivot about one end and move with an up and down motion and not a rotary motion, so that the other end of the pedal arm is always disposed between the one or pivot end and either the front wheel or the rear wheel. This type of motion allows the operator's center of gravity to remain generally above the other end of the pedal arm at all times and permits the operator to apply his weight alternately to one or to the other of the pedal arms or to both pedal arms to augment the muscle force provided by his legs. The handle bars extend backwardly towards the operator to overlie the pedal arms so that the operator may remain in an upright position and further augment the downward force on the pedals by an upward force applied with his hands against the handle bars. This arrangement permits more efficient utilization of the forces provided by the operator's weight and by his arm strength. In a preferred embodiment, the pedal arms have a forward pivot and extend rearwardly to minimize the danger of injury should the driving cable snap. However, a rear pivot pedal arm is also within the scope of this invention.

Drive cables transfer to the rear wheel the force applied to the pedal arms. A two cable drive may be used so that the pedal arms move either independently of one another, or a single cable drive may be employed in which the pedal arms operate in opposed relation so that as one pedal arm goes down, the other must go up. In either embodiment, the cables are coupled to the rear wheel hub by being wrapped therearound without being secured thereto. This feature permits the vehicle to be moved in a backwardly direction without snapping the cable. The cable may be maintained in an appropriately tensioned state by a spring, by an expanding hub assembly, or by a spring tensioned reel to prevent the cable from becoming unraveled from the wheel hub.

The vehicle of the present invention further provides for ease of disassembly and transportation when the bicycle itself is not being ridden. The vehicle may be disassembled into components, one component comprising the front wheel and the handle bars, and another component comprising the frame, the pedal arms, and the rear wheel. If a seat is provided, it would comprise a third component. In a preferred embodiment, the point at which disassembly may be accomplished is the steering pivot. When disassembled, the bicycle is sufficiently compact to provide for easy transportation. In addition, the disassembled bicycle has a large vertical dimension and occupies very little horizontal floor space so that it may be easily carried on a mass transit vehicle.

BRIEF DESCRIPTION OF THE DRAWINGS

The above-mentioned features of this invention and the manner of attaining them will become more apparent and better understood by reference to the following description of the accompanying drawing, wherein.

DETAILED DESCRIPTION OF THE PREFERRED EMBODIMENTS

Figure 1:
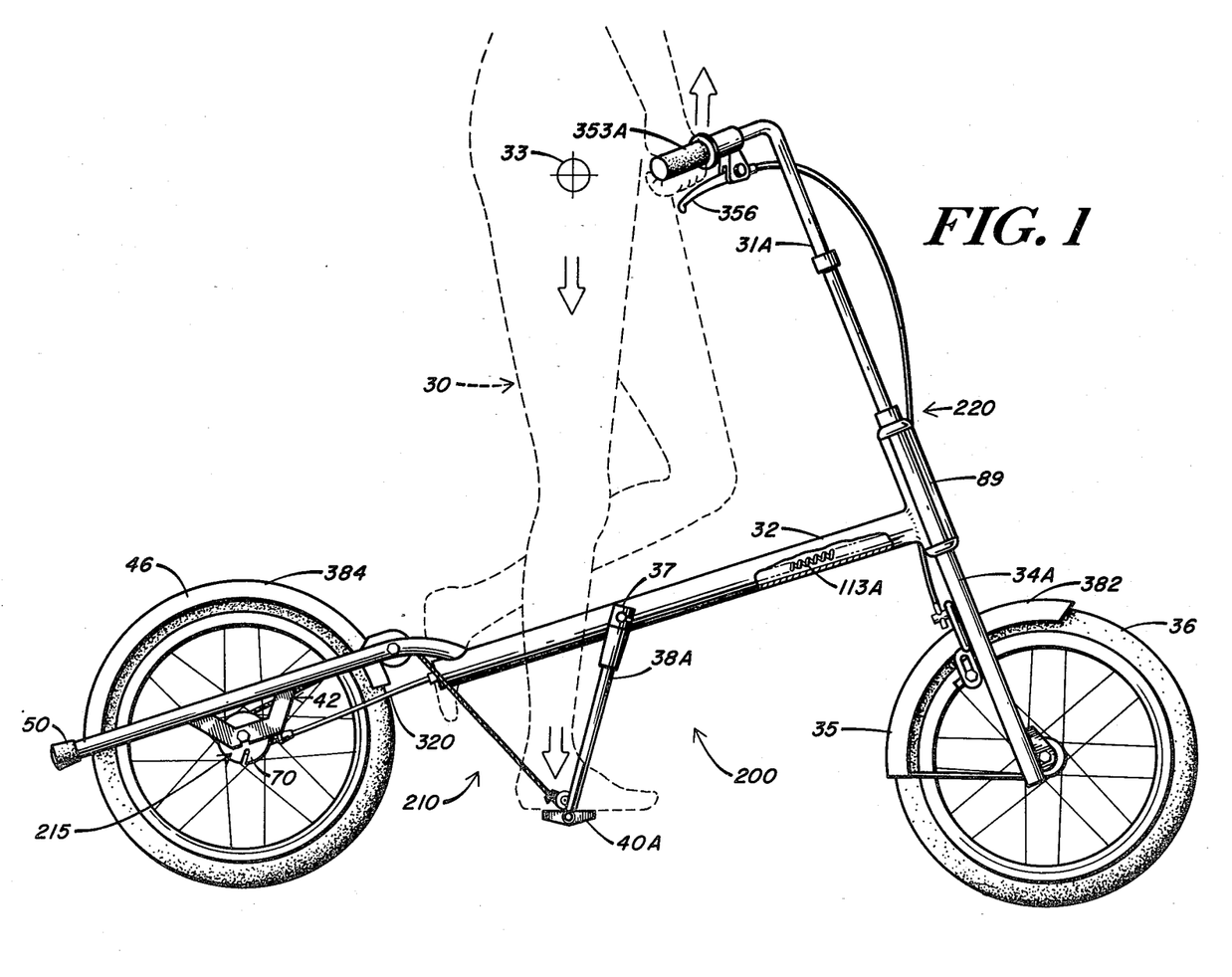
FIG. 1 is a side pictorial view of one embodiment of the vehicle of the present invention without a seat.

Referring now to the drawing and more specifically to FIG. 1, a vehicle 200 is shown according to one embodiment of the invention. The basic vehicle 200 comprises front and rear wheels 36 and 46 respectively, a frame 32, a steering assembly 220, a force transmission assembly 210, and a rear hub subassembly 215. Force transmission assembly 210 typically includes pedal arms 38A and 38B having respective pedals 40A and 40B. The force transmission assembly 210 conveys the total force produced on pedal arms 38A and 38B by the operator 30 to the rear wheel 46 via a rear hub subassembly 215, as discussed below.

Each of the above-referenced assemblies is deployed relative to the vehicle frame in a manner which maximizes the propelling force supplied by the operator 30 as well as which renders vehicle 200 convenient to ride and transport in an urban environment. Steering assembly 220 includes handlebars 31A and 31B which extend backwardly towards operator 30 and which are splayed outwardly so that the ends thereof are disposed on either side of operator 30. Handgrips 353A and 353B (FIG. 12) on the ends of respective handlebars 31A and 31B allow operator 30 to grasp the handlebars. Handgrips 353A and 353B generally overlie or are positioned vertically above force-reception elements, including pedal arms 38A and 38B and pedals 40A and 40B, of the force transmission assembly 210. This configuration allows the operator 30 to propel the vehicle while in a substantially vertically erect or upright position, called a force weight position. Since operator 30 is generally in an upright position, his center of gravity 33 is generally vertically aligned with his feet and with pedals 40A and 40B. In this configuration, the center of gravity 33 of the operator 30 resides within or in close proximity to his body. This forced weight position permits the operator 30 to augment with his body weight the driving force normally provided only by his legs. Additionally, since handgrips 353A and 353B overlie respective pedal arms 38A and 38B, operator 30 may provide an additional downward force to the pedal arms by a lifting force applied upwardly by his arms on hand grips 353A and 353B. The extension of handlebars 31A and 31B towards operator 30 is possible because the pedal arms 38A and 38B exhibit only a limited up and down pivotal motion and not a rotary motion as in most bicycles, and this reduces the forward knee action which would otherwise interfere with handlebars 31A and 31B. Typically, for a body weight of 160 pounds and an operator arm lifting force of approximately 90 to 120 pounds per arm, a total downward drive force to the pedal arm of 340 to 400 pounds will result.

Figure 2:
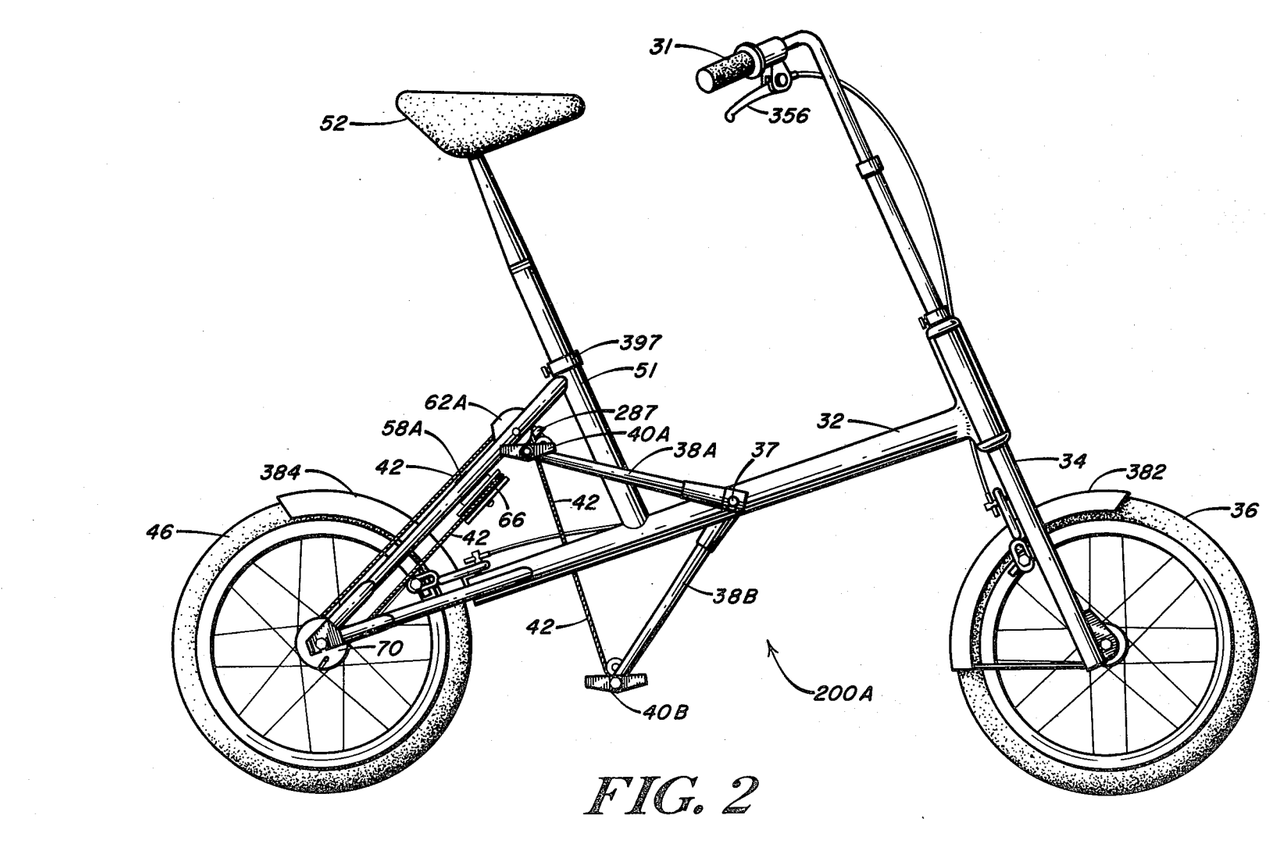
FIG. 2 is a side pictorial view of one embodiment of the vehicle of the present invention with a seat.

An optional adjustable seat 52 and support 51 are shown in FIG. 2. The seat 52 is so disposed as to provide the operator with a convenient rest as well as the optimal upright position described above. The seat 52 does not interfere with the operation of the vehicle 200 described above and hereunder. Seat 52 is not essential to this invention, but may be provided for rider comfort.

The vehicle of the present invention also has a frame 32 which closely spaced from the ground surface to permit easy mounting and dismounting from the vehicle. Frame 32 may be formed of tubing or a solid member which extends from the vicinity of the axis of rotation of rear wheel 46 to steering assembly 220 at a point between handlebars 31A and 31B and front wheel 36. Frame 32 forms a small angle with respect to the ground. The location of handlebars allows the operator 30 to maintain a substantially upright position at all times. This low positioning of the frame is partially a result of the use of a non-triangulated frame, in contrast to most bicycles.

The elements of the force transmission assembly 210 are shown in FIGS. 1–10, 15 and 16. The force transmission assembly 210 generally includes pedal arms 38A and 38B, as indicated, associated pedals 40A and 40B, at least one flexible cable 42, pulleys 56 and 60, at least one unidirectional hub 70, and cable tensioning means shown in FIGS. 5A, 13 and 16. The various embodiments and the interconnection of each of the elements of the force transmission assembly 210 are explained in greater detail hereunder.

Pedal arms 38A and 38B of the vehicle are of the lever type and are disposed opposite one another on each side of frame 32. Pedal arms 38A and 38B, in this embodiment, have a pivot 37 forward of their associated pedals 40A and 40B for safety to prevent the vehicle from being catapulted forward if the drive should snap, as may happen in a rear pivot system. However, a vehicle having a rear pivot pedal arms is within the scope of this invention. Pedals 40A and 40B are pivotally connected to the distal ends of respective pedal arms 38A and 38B and are adapted to receive the operator's feet and the downward force exerted thereby. The pedal arms 38A and 38B are pivoted with an up and down motion and not a rotary motion. Pedals 40A and 40B are permitted to travel in an arc which is, at all times, positioned between pivot 37 and rear wheel 46. The exact size of the arc used is determined by operator 30 who may use the entire available pedal arm travel or who may use only a portion thereof. Most of the force is transmitted to the pedal arm at the bottom of the arc and thus, that is the most important part thereof. In this manner, the horizontal displacement of the point where the operator applies force, i.e., the pedals 40A and 40B, is minimized. By minimizing this horizontal displacement, the operator 30 may more easily maintain a more efficient riding position in which he is vertically positioned, and in which his center of gravity remains disposed at all times generally over the pedals 40A and 40B and behind pivot 37. Also, his knees will not strike the steering assembly 220.

Figure 6:
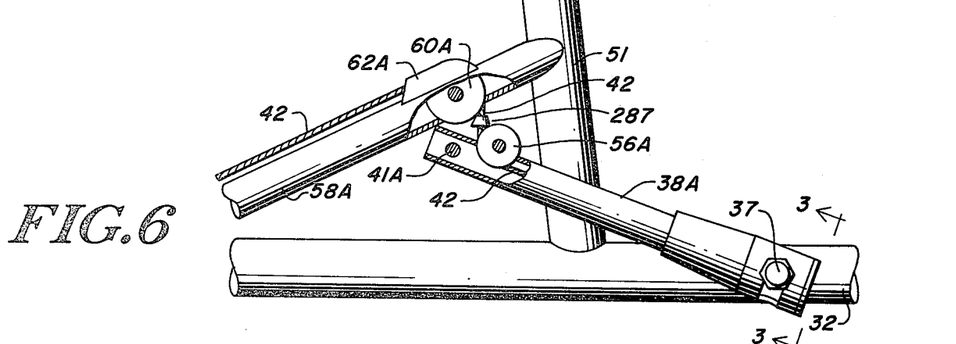
FIG. 6 is a partial cut-away showing the drive cable in the pedal arm of FIG. 5.
Figure 7:
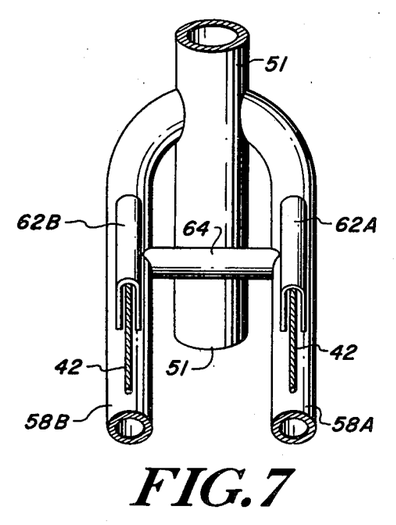
FIG. 7 is a partial rear view of the frame and rear pedal pulleys.
Figure 8:
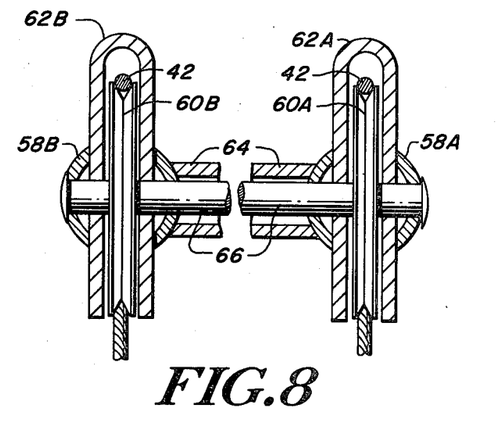
FIG. 8 is a cross-sectional view of the frame and pedal pulley mounting of FIG. 7.

The propelling force provided by the operator 30 as applied to the pedals 40A and 40B is translated by downward motion of pedals 40A and 40B into a force or tension applied to a drive cable 42 causing a forward longitudinal movement thereof. This forward motion of cable 42 drives rear hub subassembly 215. Either a single cable or a two cable system may be used. In either system, the bike frame support typically has two identical diagonally disposed rear wheel supports 58A and 58B, as shown in FIGS. 6-8. Supports 58A and 58B have pulley 60A and 60B respectively over which drive cable 42 passes from respective pedal arms 38A and 38B. Pulley housings 62A and 62B, which surround respective pulleys 60A and 60B, assist in retention of the drive cable on the pulley during operation and provide protection, a covering and structural support for the pulleys 60A and 60B. The pulley arrangement exists in symmetrical relation on each side of the rear wheel, as shown in FIGS. 7 and 8. The rear wheel supports 58A and 58B, are connected and maintained in spaced relation by lateral support 64. An axle pin 66 passes through member 64 and serves to secure pulleys 60A and 60B and to provide an axis about which they may rotate. The two rear wheel support members 58A and 58B may be attached to the vehicle frame 32 as shown in FIG. 1 or they may be attached to the seat structure or seat support 51 as shown in FIG. 2.

Figure 5:
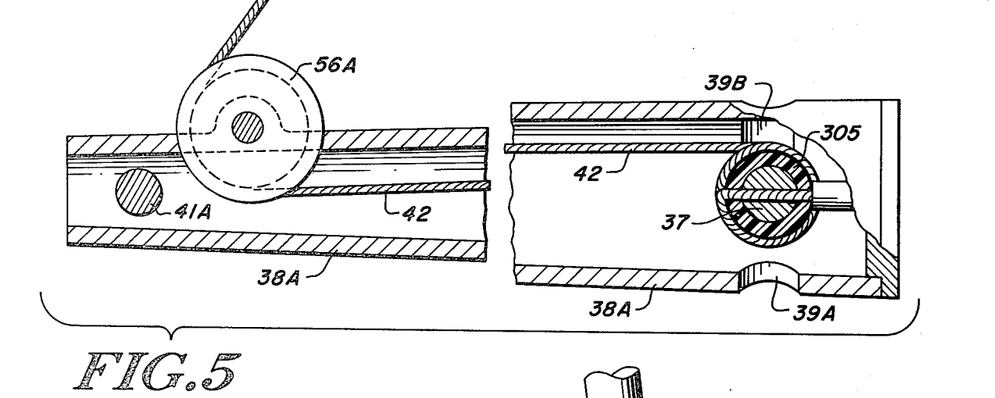
FIG. 5 is a cross-sectional view of one pedal arm of the invention.
Figure 5A:
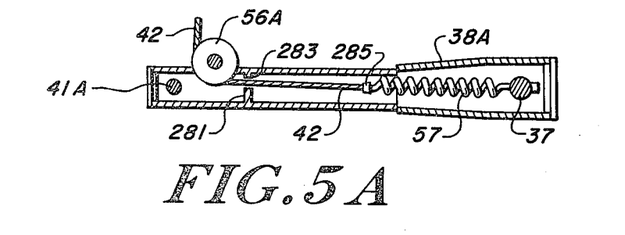
FIG. 5A is a cross-sectional view of another pedal arm of the invention.

One of the pedal arms 38A is shown in FIGS. 5 and 6. Drive cable 42 is secured at the pivot 37 and extends within arm 38A along the length thereof. Cable 42 is preferably wrapped around pivot 37 as shown in FIG. 5. A layer of resilient material 305 may be provided between cable 42 and pivot 37 to act as a shock absorber when the pedal reaches the lower end of its arc and the cable 42 is taut. Material 305 provides a cushioning effect so that when the lower end of the arc is reached, downward pedal movement is not abruptly ended and the operator feels no discomfort. A pedal arm pulley 56A is disposed on the pedal arm adjacent pedal shaft 41A. Pulley 56A may be a nonrotatable cable guide as shown in FIG. 5 for a two cable system, or pulley 56A may be freely rotatable as shown in FIG. 5A, when cable 42 is spring loaded in a single cable system to be described below. A resilient shock absorber 287 is provided on cable 42 adjacent pulley 56A to cushion the impact between pulley 56A and pulley 60A when arm 38A is in a raised position. Pedal 38B is identical to pedal 38A and has the same corresponding elements. Pedal travel is limited on the upper end and lower end of the stroke by pulley housings 62A and 62B which strike shock absorbers 287 of associated pulleys 56A and 56B respectively of pedal arms 38A and 38B when pedal arms 38A and 38B are raised sufficiently high.

Figure 9:
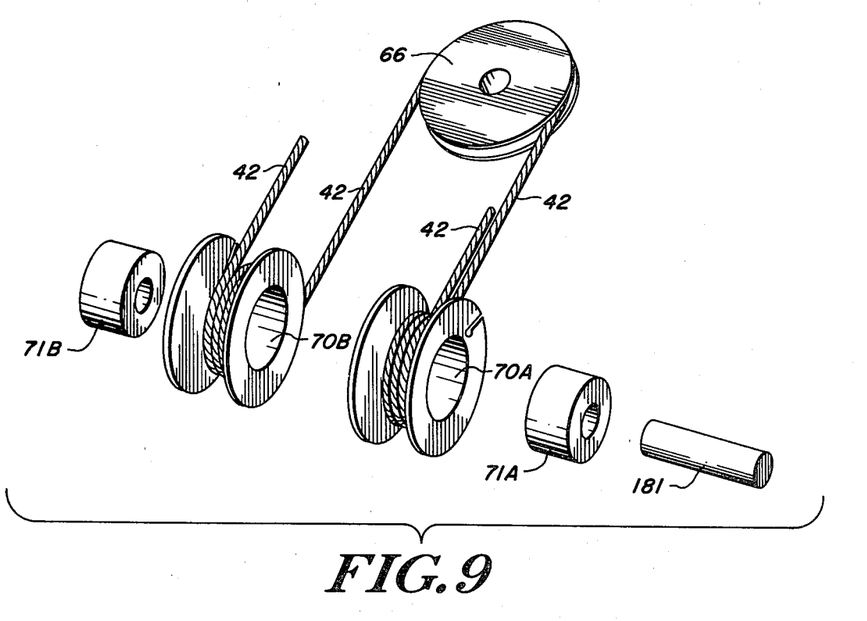
FIG. 9 is a schematic view of a single drive cable routing for the pedal pulleys of FIG. 7.
Figure 10:
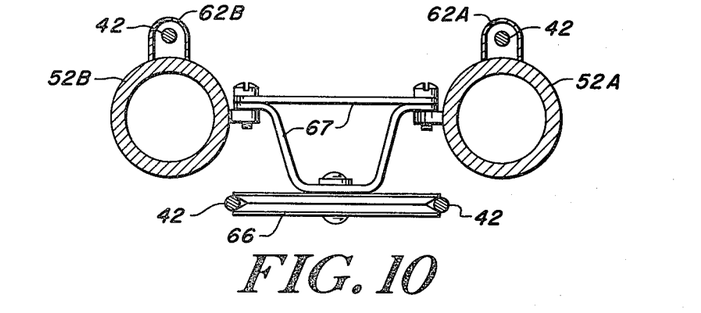
FIG. 10 is a cross-sectional view of the frame and cross over pulley of in FIG. 9.

FIGS. 9 and 10 show the cable arrangement and rear hub subassembly of a single cable system. The rear hub subassembly includes an axle 181 and two independent hubs 70A and 70B rotatably mounted on axle 181. Hubs 70A and 70B are coaxial and are disposed on either side of wheel 46. Axle 181 is coupled directly to wheel 46, while hubs 70A and 70B are independently coupled to axle 181 by unidirectional clutches 71A and 71B which are coaxial with and reside within respective hubs 70A and 70B. The drive cable 42 passes from pedal 40A of pedal arm 38A through its pulley 60A, as shown in FIGS. 7 and 8, to associated hub 70A. Cable 42 is wrapped spirally around hub 70A. Cable 42 then passes from hub 70A forwardly to a generally horizontally disposed pulley 66 mounted to supports 58A and 58B by bracket 67 (FIG. 10). Cable 42 passes over pulley 66 and extends from pulley 66 rearwardly to the other hub 70B. Cable 42 is wrapped spirally about hub 70B. Cable 42 then extends forwardly to pulley 60B and pedal 40B of pedal arm 38B. Cable 42 is wrapped about both hubs 70A and 70B in a direction such that as pedal arm 38A is driven downwardly by the operator, associated hub 70A rotates in a forward or clockwise direction, as shown in FIG. 9 and hub 70B rotates in a rearward or counterclockwise direction, as viewed in FIG. 9. Conversely, downward motion of pedal arm 38B produces forward rotation of hub 70B and rearward rotation of hub 70A. Downward movement of the pedal on one side of the vehicle causes a simultaneous upward movement of the pedal on the other side of the vehicle, and the drive cable 42 is cycled back and forth between the pedals as they are moved alternately upwardly and downwardly. Pedal travel is limited by pulley housings 62A and 62B which are struck by shock absorbers 287 of respective pedals 40A and 40B and which also prevent further downward movement of each pedal by limiting the upward movement of the other pedal. Clutches 71A and 71B only couple hubs 70A and 70B to axle 181 during forward rotation thereof, so that only forward movement of cable 42 drives wheel 46. Hubs 70A and 70B rotate respective clutches 71A and 71B freely about axle 181 during the rearwaard rotation thereof.

The cable of a single cable drive system must be maintained in a tensioned state during nonuse to prevent unraveling of cable 42 from hubs 70A and 70B. One type of tensioning device is spring 57 disposed in each pedal arm as found in FIG. 5A which shows an alternative configuration of pedal arm 38A of FIG. 5. Pedal arm 38B is identical to pedal arm 38A. Spring 57 may be used in conjunction with hubs 70A and 70B and clutches 71A and 71B of FIG. 9 and can be used in the single cable drive system only. One end of spring 57 is secured to cable 42, while the other end is secured to pivot 37. Although shown as an extension spring, spring 57 may be also a compression spring. A stop plate 281 having an aperture 283 through which cable 42 passes is provided to engage a stop 285 disposed on cable 42 adjacent a facing end of spring 57 to prevent over extension of spring 57. Spring 57 is disposed in each pedal arm 38A and 38B and serves to absorb the extra length of cable 42 and to urge both pedal arms 38A and 38B to a raised position during nonuse. This action keeps cable 42 wrapped about hubs 70A and 70B at all times. If the vehicle is moved rearwardly, cable 42 slips on hubs 70A and 70B without damage thereto, and springs 57 maintain cable 42 in a wrapped condition about hubs 70A and 70B, while tending to raise pedal arms 38A and 38B.

Figures 15, 16, 17:
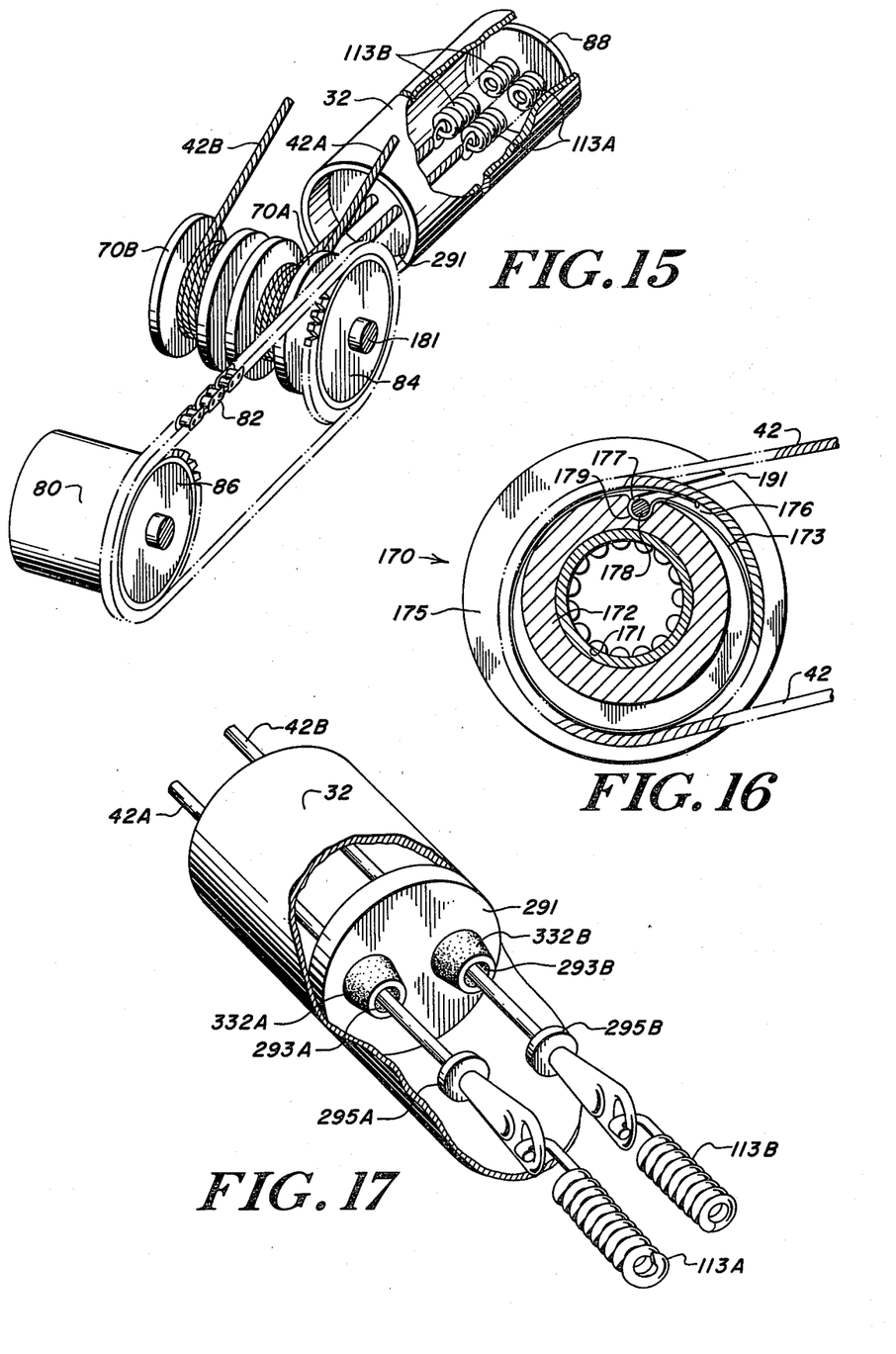
FIG. 15 is a perspective view of a unidirectional hub drive and sprocket drive of the bicycle of FIG. 14.
FIG. 16 is a side view of spring type unidirectional hub drive of this invention.
FIG. 17 is a partial cut away perspective view of the stop plate of FIG. 15.

Another type of tensioning device which may be used in a single cable drive system is an expanding-type unidirectional element 170 shown in FIG. 16. Hubs 70A and 70B and clutches 71A and 71B of FIG. 9 would each be replaced by an element 170 in the rear hub subassembly, and the pedal arms as shown in FIG. 5 without springs 57 are used in this embodiment. A cross-sectional view of element 170 shows a cylindrical hub 172, spring 173 and cable 42 wrapped about hub 172. Hub 172 is coupled to axle 181 by unidirectional clutch 171. There are two parallel collars 175 on either side of hub 172 to provide for lateral retention of the spring 173 and to retain drive cable 42 within the element 170. Spring 173 is typically a strip of highly resilient metal which is wrapped about cylindrical hub 172. Spring 173 is anchored along edge 177 by insertion into transverse slot 179 which is formed in hub 172 and which extends thereacross between collars 175. A pin 178 is driven through a hole in collar 175 to secure edge 177 of spring 173. A slot 191 is provided in collar 175 to permit the installation of spring 173 by the lateral insertion thereof through slot 191 and into position between collars 175. Edge 176 of spring 173 remains free, and presses outwardly on the cable 42 which is wrapped therearound. As shown, the spring 173 is interposed between the wrapped cable 42 and the hub 172 so that the forward tangential movement of cable 42 compresses spring 173. When spring 173 is sufficiently compressed, the drive cable 42 will transmit the cable tangential force to the outer surface of the hub 172 to rotate it. When the pedal arms 38A and 38B are released by the operator, cable 42 will be urged rearwardly by the spring 173 which exerts an outward force and expands against the wrapped drive cable 42. Spring 173 absorbs the extra length of the drive cable 42 to tension the cable 42 to keep cable 42 wrapped about hub 172 and to urge both pedal arms 38A and 38B to a raised position. Cable 42 again may slip about hub 172 without damage when the vehicle is moved rearwardly, because cable 42 is only wrapped thereabout and is not otherwise secured thereto.

Figure 13:
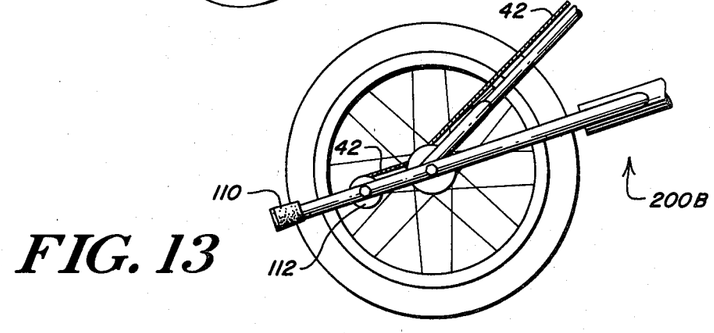
FIG. 13 is a side view of an embodiment of the vehicle of FIG. 2 having a cable reel.
Figure 14:
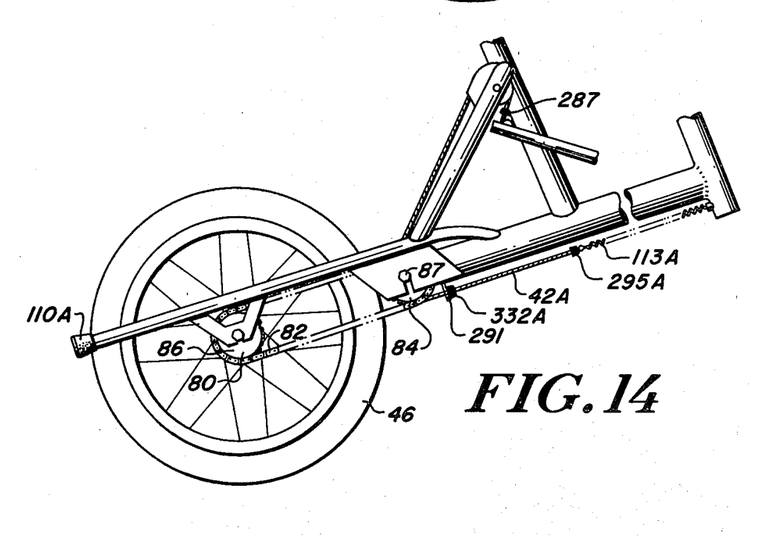
FIG. 14 is a side view of another embodiment of the vehicle of FIG. 2 employing a multi-speed hub.

A second embodiment of the force transmission assembly 210, as shown in FIGS. 1, 13, 14 and 15 has two independent drive cables 42A and 42B, one cable 42A or 42B being associated with each pedal arm 38A and 38B respectively. Pedal arms 38A and 38B are as shown in FIGS. 5 and 6. Rather than having each end of the drive cable terminate in a different pedal as in the single cable drive, each cable of the dual cable drive has one end which is secured to its associated pedal arm and another end which terminates independently of a pedal. As a result, there is no longer a need for a cross-over pulley 66, shown in FIGS. 9 and 10. In the two cable configuration, each cable 42A or 42B passes from its respective pulleys 60A or 60B and is spirally wrapped around its respective hub 70A or 70B, in the manner shown in FIG. 15. Hubs 70A and 70B again rotate independently of each other, and in the embodiment of FIGS. 1 and 13 are disposed on axle 181 on either side of wheel 46 and rotate about a common axis. As the pedal ends of the drive cables 42A and 42B are cycled back and forth, the other end of each respective drive cable will also move back and forth, and thus a tension must be applied to the non-pedal termination ends of cables 42A and 42B to keep cables 42A and 42B tightly wrapped about hubs 70A and 70B and to return pedals 40A and 40B to a raised position. In one embodiment, the tension is produced by respective springs 113A and 113B. Springs 113A and 113B, may be long, coiled springs running longitudinally through frame 32 of the vehicle, as shown in FIG. 1, or underneath frame 32 as shown in FIG. 14. Springs 113A and 113B are each secured at one end to an anchor 88 on frame 32 adjacent steering assembly 220 and at the other end to a respective cable 42A and 42B. Springs 113A and 113B may be either compression or extension springs, and known means may be provided for adjusting the tension thereof.

Cables 42A and 42B may be sheathed in a conduit 320 (FIG. 1) as they pass from hubs 70A and 70B to their respective springs 113A and 113B to redirect the cables. Conduit 320 is necessary because cables 42A and 42B must exit respective hubs 70A and 70B normal to axle 181 to prevent overlapping thereof. However, springs 113A and 113B are disposed centrally on frame 32 between hubs 70A and 70B and thus, if the cables passed directly thereto, they would form an angle with respect to the axle and rub against wheel 46. Conduit 320 may be composed of nylon or any other suitable material. A plurality of pulleys may also be used to perform the function of conduit 320 in a manner known to those skilled in the art.

As shown in FIGS. 14, 15, and 17, a stop plate 291 may be provided to prevent over-extension or compression of springs 113A and 113B and to prevent them from becoming wrapped around hubs 70A and 70B. Plate 291 may be either within frame 32, as shown in FIGS. 15 and 17 or disposed along the underside of frame 32, as shown in FIG. 14, depending upon the location of springs 113A and 113B. Plate 291 has apertures 293A and 293B through which respective cables 42A and 42B pass and which are adapted to engage respective stops 295A and 295B adjacent the respective connections of springs 113A and B to cables 42A and 42B when the spring has been extended a specified distance. Plate 291 also serves to limit pedal travel at the lower end of the pedal arc. Resilient aperture guards 332A and 332B may be provided adjacent respective apertures 293A and 293B to cushion the arresting action of plate 291 and prevent damage to the cables 42A and 42B or the rest of the drive system.

Reel type spring assemblies 112A and B as shown in FIG. 13 may also be used as an alternative to springs 113A and 113B to tension cable 42A and 42B. Each reel assembly 112A and 112B is secured to an end of respective cable 42A and 42B, and assemblies 112A and B are secured to frame 32, typically rearwardly of hubs 70A and 70B. Assemblies 112A and 112B may be positioned anywhere close to hubs 70A and 70B so that the cables exit hubs 70A and 70B normal to axle 181. Reel assemblies 112A and 112B are spring wound and serve to maintain a pulling tension on cables 42A and 42B respectively, winding the cables about a reel. As pedal arms 38A and 38B are pushed downwardly, the force of the operator overcomes the spring tension on the cables, causing them to unwind from assemblies 112A and 112B respectively to rotate hubs 70A and 70B. Other types of spring assemblies may be used to tension cables 42A and B and the above examples are not intended to be limiting.

A third embodiment of the force transmission assembly is shown in FIG. 14, and in more detail in FIG. 15, wherein a conventional bicycle wheel is employed having a multiratio (e.g., multi-speed) drive hub 80. Hubs 70A and 70B are mounted on an axle 181 independently of and spaced from the drive hub 80. Two cables 42A and 42B are wound thereabout and drive hubs 70A and 70B and axle 181 as previously described for a two cable drive system. A chain 82 or other suitable drive couples a drive sprocket 84 mounted on axle 181 to sprocket 86, which drives hub 80 of rear wheel 46, as shown in FIG. 14. The cable tension springs 113A and 113B are described above and are shown extending within the frame 32, but they may be alternatively housed elsewhere. Springs 113A and 113B are anchored to a wall 88 or any other securing means on or adjacent frame 32, as described.

In each of the previously described embodiments, the hubs 172 and 70A and 70B typically are coupled to an axle 181 of wheel 46 by respective unidirectional clutches 171 (FIG. 16) and 71A and 71B (FIG. 9). Clutches 171 and 71A and 71B typically are roller clutches, such as Torrington type FC-35 clutches or they may also be a standard ratchet and pawl clutch. Clutches 71A, 71B and 171 selectively provide torque coupling with axle 181 in one direction, such as a clockwise direction in FIG. 9, to provide forward movement of the bicycle, and free rotation when hubs 70A, 70B or 172 are stationary or rotate backwardly, such as in a counterclockwise direction in FIG. 9.

Spring 173 of FIG. 16, spring 57 of FIG. 5A, assembly 112 of FIG. 13, and springs 113A and 113B of FIG. 1 each maintain tension on the cable 42 to urge the corresponding pedals to return to a raised neutral position when not in use and to prevent the cable from becoming unraveled when the pedals are raised. In the two cable embodiments, the pedal arms are raised into a position so that pulleys 56A are closely adjacent pulley 60A, separated by shock absorber 287, as shown in FIG. 6, or as shown in FIG. 14. In the single cable embodiment, spring 173 need only be strong enough to take up any cable slack when pedal arms 38A and 38B are raised toward frame 32 when not in use, their exact position depending upon the position in which they are left by the operator. In each of the above described embodiments, if the vehicle is moved manually or otherwise in a rearwardly direction, clutches 71A and 71B or 171 (FIG. 9) engage axle 181. However, in such rearward movement, cables 42A and 42B slip about hubs 70A and 70B or element 172, since the cable is only wrapped thereabout and not attached thereto, and thus the vehicle may be moved rearwardly without damage. When a driving force is applied to the pedal arms, the cable is prevented from slipping about hubs 70A and 70B and element 172 by the anchoring of one end of the cable and the spring biasing of the other end of the cable, as described. Pedal travel at the lower end of the pedal arc is limited either by stop plate 291 (FIG. 17) for the two cable embodiments or by pulley housings 62A and 62B for the single cable embodiments, while pedal travel at the upper end of the pedal arc is limited by pulley housings 62A and 62B in all cases.

If desired, a spiral, outwardly extending lip (not shown) may be provided about hubs 70A and 70B and on hub 172 defining a spiral track to properly align cable 42 as it is wrapped thereabout and to prevent cable 42 from abrading with itself.

The vehicle of this invention may be partially disassembled for transport onto a mass transit vehicle or elsewhere. The steering assembly 220 may be disassembled at the front pivot 89. When disassembled, the vehicle is compact and extends in a vertical direction, taking up very little floor space. It may be transported in any convenient manner and may be carried anywhere, including on a mass transit vehicle. A crutch tip 110 (FIGS. 13 and 14) may be provided on each extension of frame 32 beyond wheel 46 to allow the vehicle to rest in an upright position on the floor. Tips 110 are sufficiently spaced from wheel 46 to allow a person's feet to reside between a floor and wheel 46. A typical vehicle when folded has dimensions of 47" by 12" by 12".

Figure 11:
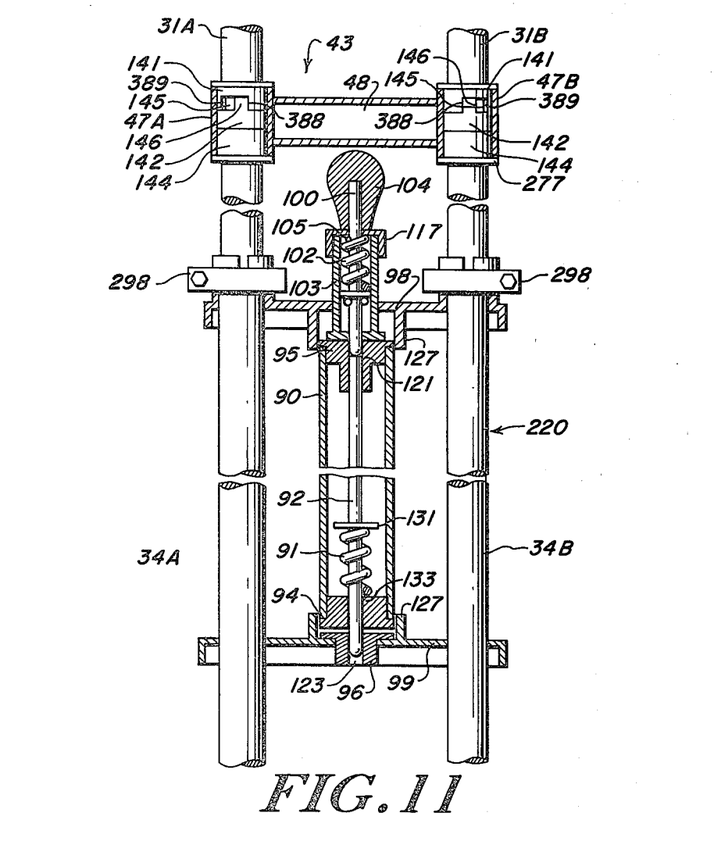
FIG. 11 is a front view of a steering pivot assembly of the vehicle of FIG. 1.
Figure 12:
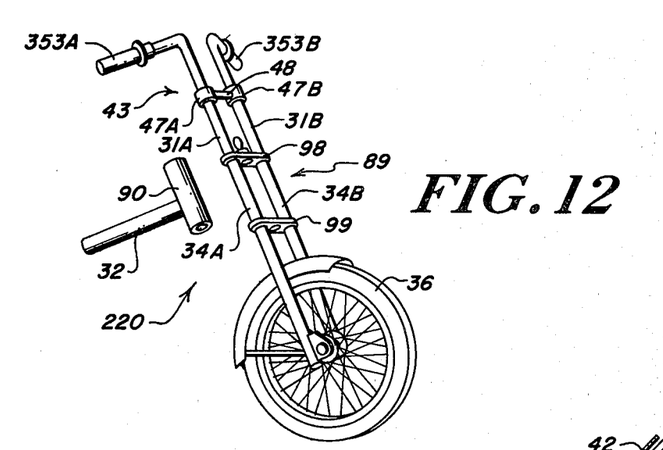
FIG. 12 is a partial pictorial view of the steering assembly of the vehicle of FIG. 1.

With reference to FIGS. 11 and 12, steering assembly 220 and its manner of connection to frame 32 will be described. Assembly 220 includes steering supports 34A and 34B which are disposed in either side of wheel 36 and which are connected to the axle of wheel 36 at one end thereof in a manner known to those skilled in the art. A tubular housing 90 is secured to the end of frame 32 transversely thereof and is the linkage by which frame 32 is secured to steering assembly 220. When assembled, housing 90 is axially captured between cross-supports 98 and 99 which extend parallel to one another between vertical steering supports 34A and 34B. Lips 127 on supports 98 and 99 restrain housing 90 laterally and guide housing 90 when it is inserted into place between supports 98 and 99. Lips 127 may have a generally semi-circular configuration, with the open portion facing frame 32. Housing 90 is essentially perpendicular to cross-supports 98 and 99 in the assembled position shown in FIG. 11. A plunger 104 in support 98 has a pin 100 which is secured thereto and which extends downwardly therefrom into housing 90 through a tube 103 which extends upwardly from support 98 and is secured thereto. Plunger 104 and pin 100 are spring biased downwardly by compression spring 102 so that plunger 104 is urged into contact with housing 117 disposed on an upper rim of tube 103 which acts as a stop. Pin 100 and plunger 104 are rotatable with respect to tube 103, and pin 100 has a projection 105 which extends radially outwardly therefrom and which is adapted to pass vertically through a slot in housing 117. Plunger 104 may be locked into a raised position using projection 105 by raising plunger 104 and pin 100 upwardly until projection 105 is above housing 117 and then rotating plunger 104 until projection 105 is not aligned with its slot and overlies housing 117. When plunger 104 is lowered by passing projection 105 through its slot, a lower end of pin 100 is urged into contact with an upper end of a pin 92 extending axially through housing 90. Pins 100 and 92 meet within channel 121 formed within housing 90. A lower end of pin 92 extends beyond housing 90 and into a channel 123 formed in support 99. Pin 92 is biased upwardly by spring 91 acting between bearing surface 133 and plate 131 secured to pin 92. The lower end of pin 92 is urged into channel 123 in an assembled condition by pin 100 which is urged downwardly by spring 102.

To disassemble assembly 220, plunger 104 is raised upwardly until pin 100 is raised out of channel 121 thus permitting spring 91 to raise pin 92 out of channel 123. Plunger 104 is then locked into a raised position by rotation thereof, causing projection 105 to move out of alignment with its slot and to overlie the upper rim of tube 103. Housing 90 then may be withdrawn from supports 98 and 99. The procedure is reversed when the vehicle is to be assembled, lips 127 guiding housing 90 into the proper alignment.

The handlebars 31A and 31B are adjustable to compact the vehicle for storage or carrying. The handlebar retainer 43 is shown in relation to the entire steering assembly 220 in FIG. 12. Each handlebar 31A and 31B is concentric with and slidably disposed with respect to its associated steering support 34A and 34B. Handlebars 31A and 31B preferably telescope into supports 34A and 34B respectively. Without the retainer 43, handlebars 31A and 31B would be free to rotate about and slide along the axis of the supports 34A and 34B until secured, with the result being delay and difficulty in properly and uniformly positioning the handlebars when assembling the vehicle for riding. The handlebar retainer 43 comprises two cylinders 47A, 47B, which are held in fixed relation by spacer bar 48 and which are concentric with and surround respective handlebars 31A and 31B. Spacer bar 48 also maintains handlebars 31A and 31B in the desired alignment with respect to one another. An annular ring 142 is disposed within each cylinder 47A and 47B and secured to each handlebar 31A, 31B, around the exterior thereof. Each ring 142 is concentric with its associated handlebar. An upper annular ring 141 surrounds each handlebar 31A and 31B, and each ring 141 is secured to a respective cylinder 47A and 47B. Ring 141 has a gap 145 which is bounded by two axially aligned shoulders 388 and 389. Shoulders 388 and 389 subtend an angle which is generally equal to the desired permissible angular rotation or splay of the handlebars 31A and 31B, which is typically 60°. Each ring 142 has an axially extending detent 146 residing in space 145. Detents 46 abut shoulders 388 and 389 upon rotation of handlebars 31A and 31B to limit the rotation thereof with respect to cylinders 47A and 47B and to provide an accurate means of adjusting the splay of the handlebars. Shoulders 388 serve to limit the outward splay of handlebars 31A and 31B, and shoulders 389 limit the inward splay thereof. It should be noted that shoulders 389 are optional. An annular ring 144 is disposed below ring 142 within each cylinder 47A and 47B and is secured thereto by capture ring 142 between it and ring 141 and to retain cylinders 47A and 47B securely in place on handlebars 31A and 31B. A clamp 298 disposed on the upper end of each support 34A and 34B where handlebars 31A and 31B join their respective supports and locks handlebars 31A and 31B into a desired splayed position and locks the handlebars into a desired extended position with respect to the steering supports.

Clamps 298 may be any common clamp known to those skilled in the art, including a push button or quick release clamp. A spring biased release button on handlebars 31A and 31B in combination with a series of spaced, axially aligned mating holes (not shown) in supports 34A and 34B could be used to axially align the height of handlebars 31A and 31B and to position the outer splay thereof instead of clamp 298 and rings 141, 142 and 144.

In operation, when the handlebars 31A and 31B are to be adjusted for normal vehicle operation, the handlebars are pulled upwardly in concert along supports 34 by grasping spacer bar 48 until the desired extended position or height (with respect to the particular operator) is attained. Then the handlebars are angularly splayed outwardly as shown in FIG. 12, preferably until the detents 146 reach their angular limit, abutting shoulders 388. The position of the handlebars 31A and 31B are then secured by tightening clamps 298. When the vehicle is to be compacted for storage or carrying, clamps 298 are released, and handlebars 31A and 31B are rotated about the axis of the supports 34 inwardly until they are substantially parallel to the plane of the wheel 36 and until detents 146 abut shoulders 389. The height of the disassembled assembly may be reduced by sliding the handlebars downwardly along the supports 34 toward the wheel 36.

Figure 3:
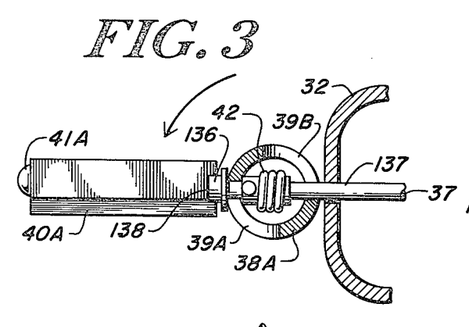
FIG. 3 is a partial cross-sectional view of the pedal of the vehicle of FIGS. 1 and 2 deployed in the riding position.
Figure 4:
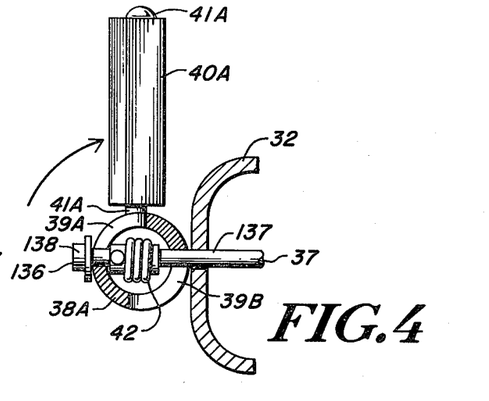
FIG. 4 is a partial cross-sectional view of the pedal of the vehicle of FIGS. 1 and 2 folded into storage position.

Pedal arms 38A and 38B each have two positions, that is, each may be rotated into an operating position or it may be folded for storage when the bicycle is disassembled. The operating and storage positions of each pedal arm are shown in FIGS. 3 and 4 respectively. Although the description of FIGS. 3 and 4 refers to pedal arm 38A only, it is to be understood that pedal arm 38B is similar to pedal arm 38A. The pedal 40A is rotatably disposed on shaft 41A which is rigidly affixed to arm 38A. Pedal 40A rotates with respect to shaft 41A to allow pedal 40A to remain essentially horizontal during the up and down movement of arm 38A. Arm 38A is shown in cross-section in FIGS. 3 and 4, and is held in position relative to the frame 32 by pivot 37. Arm 38A has two slots 39A and 39B disposed radially opposite one another. Slots 39A and 39B each form an elongated groove which extends along the circumference of the tubing and which encompasses an arc approximately equal to 90°. One end 137 of pivot 37 extends through slot 39B to frame 32, while the other end 138 of pivot 37 extends through slot 39A away from frame 32. Secured to end 138 is a bolt 136 which has a diameter greater than that of slot 39A and retains arm 38A in place by capturing a wall thereof adjacent slot 39A between it and an enlarged portion of pivot 37. This extended groove permits pedal arm 38A and the attached pedal to be rotated an angle equal to that encompassed by the slots 39A and 39B from a horizontal riding or operating position to a vertical or storage position. This operation is possible because the force applied to the pedals 40A and 40B and the pedal arms 38A and 38B during operation thereof drives pivot 37 against the upper end of slot 39A and the lower end of slot 39B, as shown in FIG. 3.

If a seat 52 is provided, it is secured to support 51 by means of a clamp 397 (FIG. 2) or release button (not shown). Seat 52 may be separated from frame 32 by releasing clamp 397 or by depressing the release button. The seat 52 is also adjusted in height on support 51 in the same manner.

With respect to materials, cable 42 may be composed of any suitable flexible material such as steel, nylon, rubber, twine, or cord. Cable 42 may also be a chain formed of any material. The steering assembly and frame may be composed of any suitable material, such as steel, aluminum or plastic.

The vehicle may be provided with front and/or rear brakes which are operable by hand levers 356 (FIGS. 1 and 2) secured to respective handle bars 31A and 31B. These brakes function in a manner well known to those skilled in the art. Wheels 36 and 46 may be mounted in a manner well known in the art, and fenders 382 and 384 may be provided for wheels 36 and 46 respectively.

Although the present invention was described with regard to a bicycle, it is equally suited to a tricycle or any other operator powered vehicle. While the above discussion describes the present invention according to one embodiment, it is understood that this description is made only by way of example and not intended to limit the scope of the invention. Other modifications and embodiments are within the scope of the invention as may be provided by those skilled in the art.

What is claimed is:

1. An operator powered vehicle comprising:
   a. a vehicle frame;
   b. a drive-wheel assembly including drive hub, a drive wheel rotatably mounted on said frame, and coupling means including a unidirectional clutch coupling said hub to said drive wheel to prevent relative forward rotation of said hub with respect to said drive wheel but permit relative forward rotation of said drive wheel with respect to said hub;
   c. a force-reception element mounted on said frame for reciprocation from a rest position thereof to other position thereof;
   d. a cable attached to said force-reception element and trained in a path for travel upon movement of said force-reception element, said cable being coupled to said hub to permit rotation of said hub without travel of said cable when said force-reception element is in its rest position but to constrain said hub, while said force-reception element is in at least a drive portion of its other positions, to rotate in the forward direction upon travel of said force-reception element away from said rest position thereof, propulsion of said vehicle forward thereby being possible by reciprocation if said force-reception element, but rearward movement of said vehicle being possible without travel of said cable when said force-reception element is in its rest position.

2. A vehicle as recited in claim 1 wherein:
   a. said cable is wrapped around the exterior surface of said hub in unsecured relationship to it to provide said coupling of said cable to said hub; and
   b. said vehicle further includes means for tensioning said cable to force said cable into sufficient frictional engagement with said exterior surface of said hub, when said force-reception member is in at least said drive portion of its path of travel, that said hub rotates with movement of said cable, the tension applied by said tensioning means when said force-reception element is in its rest position being low enough to permit relative rotation between said hub and said cable.

3. A vehicle as recited in claim 1 further including a steering mechanism pivotably mounted on said frame and including a rotatably mounted wheel and handlebars adapted for grasping by an operator of the vehicle to pivot said steering mechanism and thereby steer the vehicle and wherein said steering mechanism is removably secured to said frame.

4. A vehicle as recited in claim 1 wherein said force-reception element includes a pedal arm pivotably mounted at a first end thereof to said frame and having a pedal mounted at a second end thereof for application of force thereto by the rider, said second end of said pedal arm being constrained to remain at all times between said first end thereof and said drive wheel.

5. A vehicle as recited in claim 1 wherein said force-reception element includes a pedal arm pivotably mounted at a first end thereof to said frame and having a pedal mounted at a second end thereof for application of force thereto by the rider, said vehicle further including a steering mechanism pivotably mounted on said frame and including a rotatably mounted wheel and handlebars adapted for grasping by an operator of the vehicle to pivot said steering mechanism and thereby steer said vehicle, said handlebars having hand grips disposed thereon and adapted to be grasped by an operator's hands, one hand grip being generally vertically spaced from said pedal arm so that an operator is disposed in a forced weight position while grasping said hand grips, the operator being generally vertically erect and the center of gravity of the operator being generally vertically aligned with said second end, and an upward force applied by an operator's arms on said hand grips produces a downwardly directed force along the operator's leg to said second end of a pedal arm when the operator is a forced weight position.

6. A vehicle as recited in claim 5 wherein said first end of each of said pedal arms is generally vertically aligned with said hand grips.

7. A vehicle as recited in claim 2 wherein said tensioning means comprises a spring wound reel disposed on said frame.

8. A vehicle as recited in claim 1 or 2 wherein said drive-wheel assembly further comprises:
   a multispeed hub disposed at the center of rotation of said drive wheel;
   means coupling said multispeed hub to said drive wheel at a selected one of plurality of available gear ratios; and
   means for coupling said drive hub to said multispeed hub.

9. A vehicle as recited in claim 1 or 2 further comprising:
   means for limiting travel toward said hub of the end of said cable means remote from said force-reception member.

10. A vehicle as recited in claim 9 wherein each of said limiting means comprises:
    a plate having an aperture through which said cable drive means passes;
    stop means connected to said cable drive means, said aperture in said plate being adapted to engage said stop means to prevent said stop means from traveling past said plate; and
    shock absorber means surrounding said aperture in said plate on a side thereof facing said stop means.

11. An operator-powered vehicle as recited in claim 1 or 2 wherein said force-reception element includes a pedal arm having first and second ends, said vehicle further including an elongated member extending from said frame through said first end of said pedal arm, said elongated member being coincident with a first axis of rotation of said second end of said pedal arm, said vehicle also including pedal-arm coupling means coupling said first end of said pedal arm to said elongated member, said pedal-arm coupling means having a pair of opposed, elongated openings permitting rotation of said pedal arm about said second axis normal to said first axis and extending longitudinally of said pedal arm.

12. An operator-powered vehicle comprising:
    a. a vehicle frame;
    b. a drive-wheel assembly including a drive wheel rotatably mounted on said frame, drive hub means, and coupling means including unidirectional clutch means coupling said clutch means to said drive hub means to prevent forward rotation of said drive hub means with respect to said drive wheel but permit relative forward rotation of said drive wheel with respect to said drive hub means;

c. first and second force-reception elements, each force-reception element being mounted on said frame for reciprocation from a rest position thereof to other positions thereof; and d. cable drive means connected to said force-reception elements for travel along a path on said frame upon reciprocation of said force-reception elements, said cable drive means being wrapped in unsecured relationship about said drive hub means to permit rotation of said drive hub means without travel of said cable means when both of said force-reception elements are in their rest positions but to cause rotation of said drive hub means upon travel of said cable drive means when said force-reception elements are in at least a range of other positions, whereby propulsion of said vehicle forward is possible by reciprocation of said force-reception elements, but rearward movement of said vehicle without movement of said force-reception elements is possible when said force-reception elements are both in their rest positions.

13. An operator-powered vehicle as recited in claim 12 wherein:

a. said drive hub means includes first and second drive hubs;

b. said clutch means includes first and second unidirectional clutches associated with said first and second drive hubs, respectively, each of said unidirectional clutches coupling its associated drive hub to said drive wheel to prevent relative forward rotation of that hub with respect to said drive wheel but permit relative forward rotation of said drive wheel with respect to that hub;

c. said cable drive means includes first and second cables associated with said first and second hubs, respectively, said first and second clutches, respectively, and said first and second force-reception elements, respectively, each of said cables being connected at one end to its associated force-reception element and being trained in a path on said vehicle for travel along said path upon reciprocation its associated force-reception element, said cable being wrapped in unsecured relationship around its associated hub; and d. said vehicle further includes first and second tensioning means associated with said first and second force-reception elements, respectively, said first and second drive hubs, respectively, and said first and second clutches, respectively, each tensioning means tensioning its associated cable to urge its associated force-reception member to said rest position thereof, the tension applied by a tensioning means being low enough when its associated force-reception element is in its rest position to permit rotation of its associated hub without travel of its associated cable but being great enough when its associated force-reception element is in at least a range of other positions thereof to cause enough frictional force between its associated cable and its associated hub to constrain its associated hub to rotate in the forward direction upon reciprocation of its associated force-reception element away from said rest position thereof.

14. An operator-powered vehicle as recited in claim 12 wherein:

a. said drive hub means includes first and second drive hubs;

b. said clutch means includes first and second unidirectional clutches associated with said first and second drive hubs, respectively, each of said unidirectional clutches coupling its associated drive hub to said drive wheel to prevent relative forward rotation of that hub with respect to said drive wheel but permit relative forward rotation of said drive wheel with respect to that hub;

c. said cable drive means includes a cable connected at one end to said first force-reception element, connected at its other end to said second force-reception element, and trained in a path on said vehicle for travel along said path upon reciprocation of said force-reception elements, said cable being wrapped in unsecured relationship around said first and second hubs; and d. said vehicle further includes tensioning means for tensioning said cable to urge said force-reception elements to said rest positions thereof, the tension applied by said tensioning means being low enough when both of said force-reception elements are in said rest positions thereof to permit rotation of said hubs without travel of said cable but being great enough when said force-reception elements are in at least a range of other positions thereof to cause enough frictional force between said cable and said hubs to constrain each hub to rotate in the forward direction upon reciprocation of its associated force-reception member away from its rest position.

15. An operator-powered vehicle as recited in claim 14 wherein said tensioning means includes first spring means providing the connection between one end of said cable and said first force-reception element, said tensioning means also including second spring means providing the connection between the other end of said cable and said second force-reception element.

16. An operator-powered vehicle as recited in claim 15 further including first and second travel-limiting means associated with said first and second force-reception elements, respectively, each travel-limiting means limiting travel, with respect to its associated force-reception element, of the end of said cable connected to that force-reception element.

17. An operator-powered vehicle as recited in claim 16 wherein each of said travel-limiting means includes:

a. a plate having an aperture through which said cable passes;

b. stop means connected to said cable at a point on said cable between said plate and the force-reception element associated with that travel-limiting means, said stop means being sized relative to said aperture to enable said plate to engage said stop means and prevent it from traveling past said plate; and c. shock absorber means surrounding said aperture in said plate on the side thereof facing said stop means.

18. An operator-powered vehicle as recited in claim 14 wherein said tensioning means includes first and second radial tension elements associated with said first and second hubs, respectively, each of said radial tension elements urging said cable wrapped about its associated hub outward from its associated hub.

19. A vehicle as recited in claim 12 wherein each of said force-reception elements includes a pedal arm pivotably mounted at a first end to said frame and having a pedal mounted on a second end thereof for application of force thereto by the operator, said second end of said pedal arm being constrained to remain at all times between said first end thereof and said drive wheel.

20. A vehicle as recited in claim 19 wheein said first end of each of said pedal arms is generally vertically aligned with said hand grips.

21. A vehicle as recited in claim 12 further including a steering mechanism pivotably mounted on said frame and including a rotatably mounted wheel and handlebars adapted for grasping by an operator of the vehicle to pivot said steering mechanism and thereby steer the vehicle and wherein said steering mechanism is removably secured to said frame.

22. A vehicle as recited in claim 12 wherein each force-reception element includes a pedal arm pivotably mounted at a first end thereof to said frame and having a pedal mounted at a second end thereof for application of force thereto by the rider, said vehicle further including a steering mechanism pivotably mounted on said frame and including a rotatably mounted wheel and handlebars adapted for grasping by an operator of the vehicle to pivot said steering mechanism and thereby steer said vehicle, said handlebars having hand grips disposed thereon and adapted to be grasped by an operator's hands, each hand grip being generally vertically spaced from a pedal arm so that an operator is disposed in a forced weight position while grasping said hand grips, the operator being generally vertically erect and the center of gravity of the operator being generally vertically aligned with said second end, and an upward force applied by an operator's arms on said hand grips produces a downwardly directed force along the operator's leg to said second end of a pedal arm when the operator is in a forced weight position.

23. An operator powered vehicle comprising:
front wheel means;
rear wheel means including first and second hubs;
a vehicle frame disposed between said front wheel means and said rear wheel means;
a pair of pedal arms, each pedal arm having a first end pivotally mounted on said vehicle frame between said front wheel means and said rear wheel means and a second end adapted to accept a driving force applied by an operator, said second end of each of said arms being pivotable in response to said driving force in a predetermined arc about said first end, said second end of each of said arms being disposed at all times between said first end thereof and a selected one of said front wheel means and said rear wheel means;
force transmission means coupling each of said pedal arms to said rear wheel means to provide a driving force thereto, said force transmission means including a flexible cable means wrapped in unsecured relation about said first and second hubs, one end of said cable means terminating at one of said pedal arms and a second end of said cable means terminating at the other of said pedal arms;
means for steering said front wheel means, said steering means including a pair of handle bars extending rearwardly from said front wheel means toward said rear wheel means, each of said handlebars having hand grips disposed thereon adapted to be grasped by an operator'hands, each said hand grips being generally vertically spaced from said pedal arms so that an operator is disposed in a forced weight position while grasping said hand grips, the operator being generally vertically erect and the center or gravity of the operator being generally vertically aligned with said second end of at least one of said pedal arms when the operator is in a forced weight position;
first tensioning means associated with said one pedal arm for tensioning said first end of said cable means; and
second tensioning means disposed in said other pedal arm for tensioning said second end of said cable means.

24. An operator powered vehicle comprising
front wheel means;
rear wheel means including first and second hubs;
a vehicle frame disposed between said front wheel means and said rear wheel means;
a pair of pedal arms, each pedal arm having a first end pivotally mounted on said vehicle frame between said front wheel means and said rear wheel means and a second end adapted to accept a driving force applied by an operator, said second end of each of said arms being pivotable in response to said driving force in a predetermined arc about said first end, said second end of each of said arms being disposed at all times between said first end thereof and a selected one of said front wheel means and said rear wheel means;
force transmission means coupling each of said pedal arms to said rear wheel means to provide a driving force thereto and including a flexible cable means wrapped in unsecured relation about said first and second hubs of said rear wheel means;
means for steering said front wheel means, said steering means including a pair of handle bars extending rearwardly from said front wheel means toward said rear wheel means, each of said handlebars having hand grips disposed thereon adapted to be grasped by an operator's hands, each said hand grips being generally vertically spaced from said pedal arms so that an operator is disposed in a forced weight position while grasping said hand grips, the operator being generally vertically erect and the center of gravity of the operator being generally vertically aligned with said second end of at least one of said pedal arms when the operator is in a forced weight position; and
means associated with each of said first hub and said second hub for urging said cable means wrapped thereabout radially outwardly away from said first hub and said second hub to absorb slack in said cable means and to prevent said cable means from becoming unwrapped from said first hub and said second hub.

25. An operator powered vehicle comprising:
rear wheel means including hub means and a rotatably mounted wheel;
front wheel means;
a frame disposed between said front wheel means and said rear wheel means;
a pair of pedal arms, each of said pedal arms being pivotally mounted to said frame at a first end thereof, a second end of each of said pedal arms being pivotable in a predetermined arc about said first end in response to a driving force applied to said second end by an operator;
cable drive means coupling said pair of pedal arms to said rear wheel means, said cable drive means being wrapped in unsecured relation about said hub means of said rear wheel means, said cable drive means including a unitary cable having a first end terminating at one of said pedal arms and extending from said second end of said one pedal arm, said cable having a second end terminating at the other pedal arm and extending from said second end of said other pedal arm;

first spring means associated with said one pedal arm for tensioning said first end of said cable to prevent said cable from becoming unwrapped from said hub means; and second spring means associated with said other pedal arm for tensioning said second end of said cable to prevent said cable from becoming unwrapped from said hub means.

26. A vehicle as recited in claim 25 wherein said tensioning means assists in returning said second end of each of said pedal arms to a raised position adjacent said frame.

27. A vehicle as recited in claim 25 further comprising means associated with said one pedal arm for limiting travel of said first end of said cable with regard to said second end of said one pedal arm and means associated with said other pedal arm for limiting travel of said second end of said cable with regard to said second end of said other pedal arm.

28. An operator powered vehicle comprising:
rear wheel means including hub means and a rotatably mounted wheel;
front wheel means;
a frame disposed between said front wheel means and said rear wheel means;
a pair of pedal arms, each of said pedal arms being pivotally mounted to said frame at a first end thereof, a second end of each of said pedal arms being pivotable in a predetermined arc about said first end in response to a driving force applied to said second end by an operator;
cable drive means coupling said pair of pedal arms to said rear wheel means, said cable drive means being wrapped in unsecured relation about said hub means of said rear wheel means, said cable drive means including a unitary cable having a first end terminating at one of said pedal arms and extending from said second end of said one pedal arm, said cable having a second end terminating at the other pedal arm and extending from said second end of said other pedal arm;
means connected to said front wheel means for steering said vehicle; and
means associated with said hub means for urging said cable wrapped thereabout radially outwardly away from said hub means to absorb any existing slack in said cable and to prevent said cable from becoming unwrapped from said hub means.

29. A vehicle as recited in claim 28 wherein said urging means comprises at least one resilient strip of material secured at one end said hub means and wrapped said hub means between said hub means and said cable, said strip having a free end which is spring biased against the inner surface of the wrapped cable.

30. An operator powered vehicle comprising:
front wheel means;
rear wheel means;
a frame connected to said rear wheel means and disposed between said rear wheel means and said front wheel means;
operator powered propelling means disposed on said frame;

force transmission means coupling said propelling means to a said rear wheel means for transferring a driving force from said propelling means to said rear wheel means;
means connected to said front wheel means for steering said vehicle; and
means for interconnecting said steering means and said frame, said interconnecting means comprising:
a pair of generally parallel cross supports disposed on said steering means and having a predetermined spacing therebetween;
a tubular housing secured to said frame and having an axial length generally equal to said predetermined spacing, said tubular housing being insertable between said pair of cross supports so as to be generally normal thereto;
a plunger disposed on one of said cross supports and having a pin with a distal end extending therefrom toward the other of said cross supports, said plunger and said plunger pin being spring biased in a direction along the length of said plunger pin toward the other of said cross supports;
a first channel disposed in the other of said cross supports;
a pin disposed within said tubular housing and extending in a direction generally parallel to said axial length of said tubular housing, said tubular housing pin being spring biased along its length toward said plunger pin when said tubular housing is inserted between said pair of cross supports; and
a second channel formed within said tubular housing on an end thereof facing said plunger when said tubular housing is inserted between said pair of cross supports, said second channel having one end of said tubular housing pin slidably disposed therein and being adapted to accept said distal end of said plunger pin when said tubular housing is inserted between said pair of cross supports, said distal end end of said plunger pin being driven by the spring bias thereof against said one end of said tubular housing pin within said second channel to urge the other end of said tubular housing pin into said first channel when said tubular housing is inserted between said pair of cross supports.

31. A vehicle as recited in claim 30 further comprising a pair of semi-circular lips, one of said lips being disposed on each of said cross supports and projecting outwardly away therefrom towards the other of said cross supports, each of said lips having an opening facing said frame for accepting said tubular member, said lips assisting in positioning said tubular member in a desired location between said cross supports.

32. A vehicle as recited in claim 30 wherein said plunger is retractable to withdraw said distal end of said plunger pin from said second channel and to permit said other end of said tubular housing pin to be withdrawn from said first channel by the spring bias applied to said tubular housing pin, thereby permitting withdrawal of said tubular housing from between said pair of cross supports.

33. An operator powered vehicle comprising:
front wheel means;
rear wheel means;
a frame disposed between said front wheel means and said rear wheel means;

operator powered propelling means disposed on said frame;

force transmission means coupling said propelling means to said rear wheel means for transferring force from said propelling means to said rear wheel means;

means connected to said front wheel means for steering said vehicle, said steering means comprising:

a pair of spaced, generally parallel steering supports;

a pair of handlebars, each of said handlebars extending from an upper end of an associated steering support and being coaxial therewith, each of said handlebars being axially slidable and rotatable about its axis with respect to its associated steering support;

a handlebar cross support extending between said pair of handlebars;

housing means associated with each of said handlebars, each of said housing means being secured to an adjacent end of said handlebar cross support, each of said handlebars being rotatably disposed with respect to its associated housing means;

a pair of coaxial, axially spaced arcuate outer bosses on one of the interior surface of each of said housing means and the exterior surface of each of said handlebars;

an intermediate arcuate boss associated with each pair of outer bosses and disposed on the other of the interior surface of each of said housing means and the exterior surface of each of said handlebars, each intermediate boss being disposed coaxially of its associated outer bosses and axially between them to prevent axial movement of said handlebars with respect to said housing means, one of each intermediate boss and an associated outer boss forming a shoulder and the other forming a detent associated and axially aligned therewith to abut its associated shoulder when the handlebar on which it is disposed is rotated a specified amount in one direction to prevent further rotation of that handlebar in said one direction.

34. A vehicle as recited in claim 33 further comprising means associated with each steering support and its associated handlebar, for retaining each of said handlebars in a desired rotational and axial position with respect to its associated steering support.

35. A vehicle as recited in claim 34 wherein said retaining means comprises a clamp disposed at said upper end of each steering support.

36. A vehicle as recited in claim 33 further comprising a second shoulder disposed on an inner surface of each of said housing means, said second shoulder being spaced from and axially aligned with said one shoulder on each of said housing means for limiting rotation of an associated handlebar in a second direction opposite of said one direction.

37. An operator-powered vehicle comprising:
a. a frame;
b. a drive-wheel assembly including a drive wheel rotatably mounted on said frame; and
c. propulsion means including a force-reception element mounted on said frame and coupled to said drive wheel for rotating said drive wheel upon movement of said force-reception means to propel said vehicle, said force-reception element including:
(i) a pedal arm having first and second ends;
(ii) an elongated member extending from said frame through said first end of said pedal arm, said elongated member being coincident with a first axis of rotation of said second end of said pedal arm about said first end thereof; and
(iii) means coupling said first end of said pedal arm to said elongated member, said coupling means having a pair of opposed, elongated openings permitting rotation of said pedal arm about a second axis normal to said first axis and extending longitudinally of said pedal arm.

38. A vehicle as recited in claim 37 wherein said force-reception element further includes a pedal mounted on said second end of said pedal arm and extending generally normal to the axis thereof, rotation of said pedal arm about said second axis resulting in pivoting of said pedal about said second axis.

* * * * *